Feb. 16, 1954 C. C. SMITH 2,669,166
METHOD OF MAKING ASBESTOS-CEMENT SHEETS
Filed Aug. 16, 1949 2 Sheets-Sheet 1
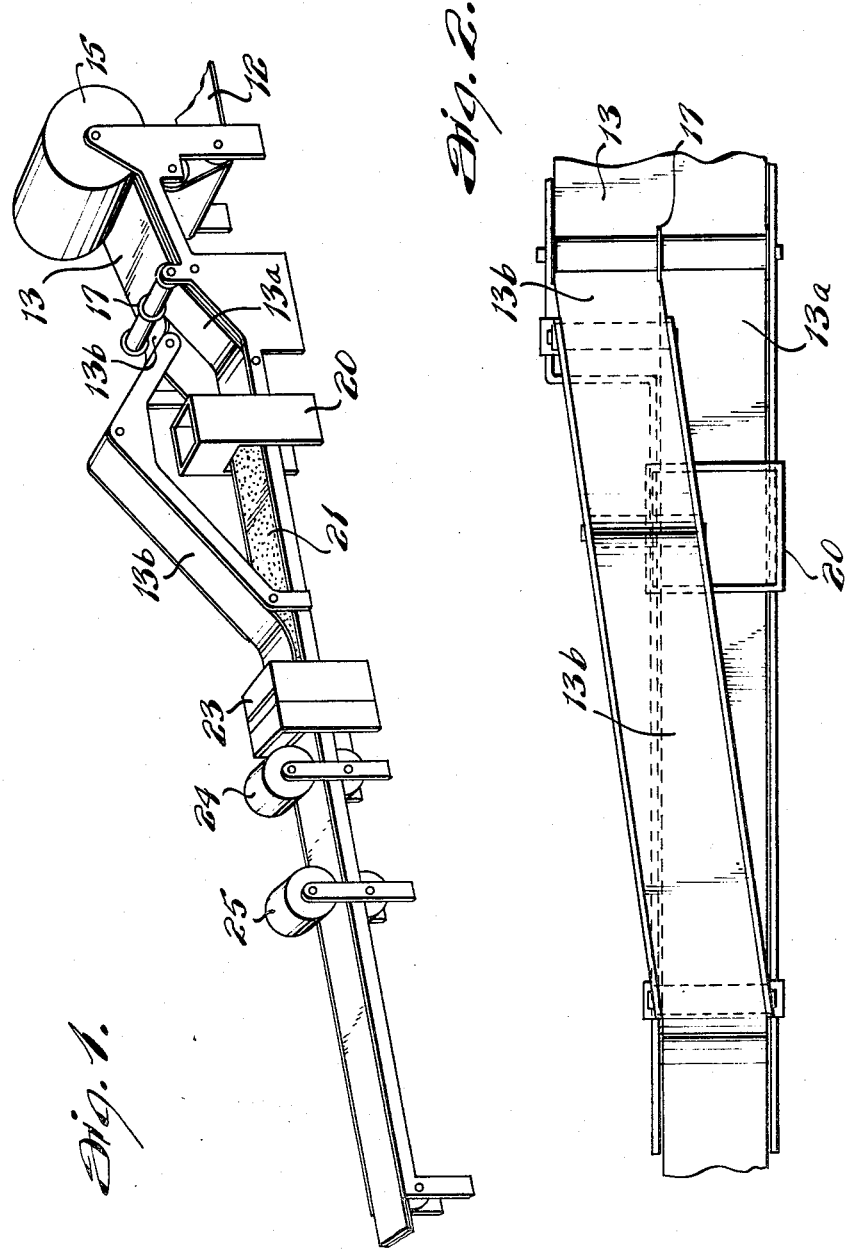
INVENTOR.
CHARLES CARTER SMITH
BY
ATTORNEY Feb. 16, 1954
C. C. SMITH
2,669,166
METHOD OF MAKING ASBESTOS-CEMENT SHEETS
Filed Aug. 16, 1949
2 Sheets-Sheet 2
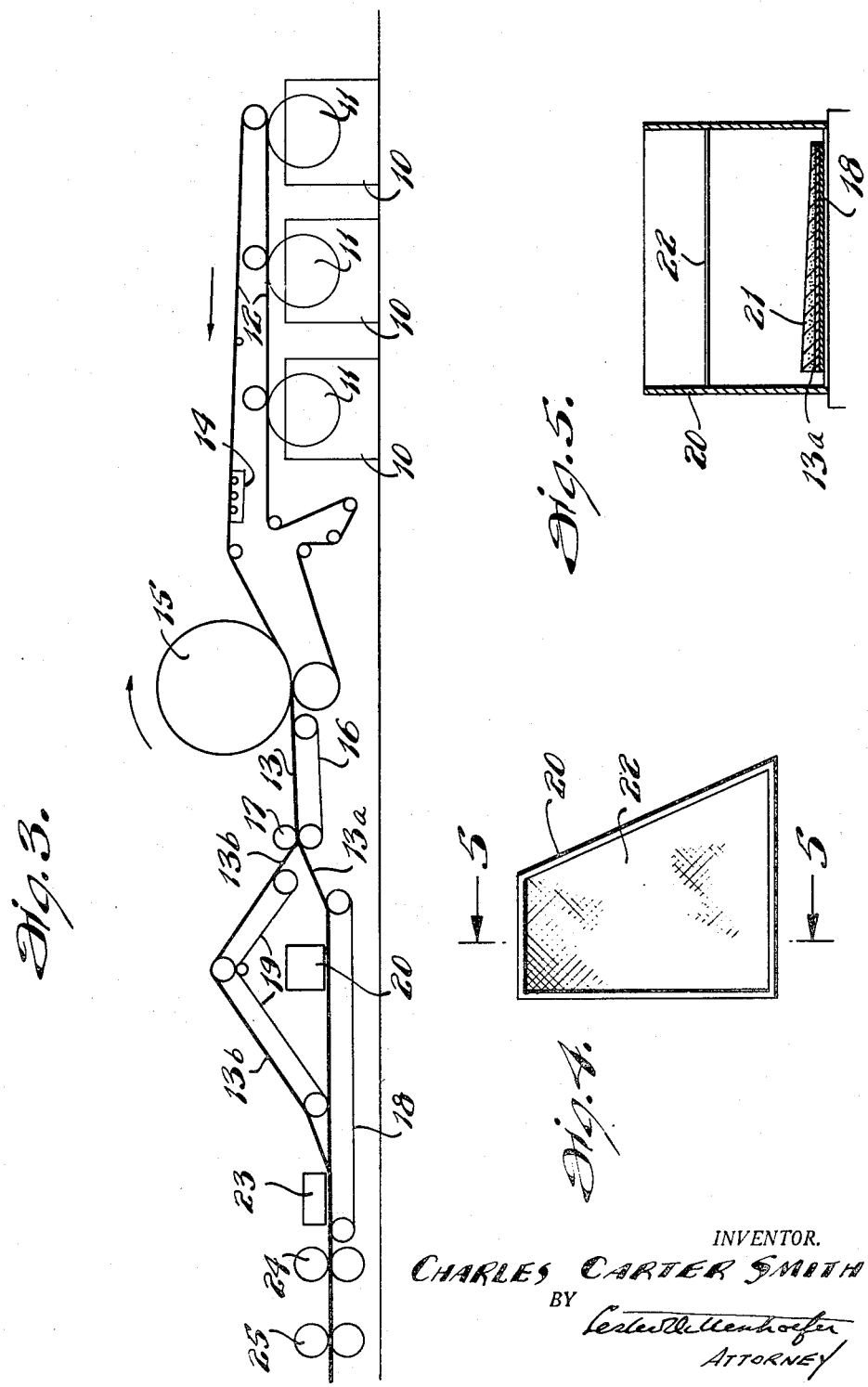
INVENTOR.
CHARLES CARTER SMITH
BY
Lester W. Ullenhoefer
ATTORNEY Patented Feb. 16, 1954

2,669,166

UNITED STATES PATENT OFFICE 2,669,166

METHOD OF MAKING ASBESTOS-CEMENT SHEETS

Charles Carter Smith, Mobile, Ala., assignor to The Ruberoid Co., New York, N. Y., a corporation of New Jersey Application August 16, 1949, Serial No. 110,564

1 Claim. (Cl. 92—40)

This invention relates to a method of making asbestos-cement sheets, and more particularly to a continuous method of making laminated asbestos-cement sheets.

One method of manufacture of asbestos-cement sheets now extensively used is the Hatschek method. According to that method a pulp or slurry of Portland or hydraulic cement and asbestos fibers is formed in one or more cylinder vats or tanks and is picked up on an endless belt or band, usually made of felt, by which it is carried to an accumulator drum or roll where it is wound, a number of times, until the desired thickness of laminated material has been obtained. The material is then slit, stripped from the drum, and laid out flat. The apparatus used in carrying out that method is known in the art as a "Hatschek machine," and is quite expensive.

The Hatschek process is subject to several objections and disadvantages, among others, that it is intermittent in that when the laminated material has been formed to the desired sheet thickness it must be stripped from the accumulator drum; and, that the sheets so formed are limited in length to the circumference of the accumulator drum.

One object of my invention is to provide a continuous method of making laminated asbestos cement sheets that permits of use of the present Hatschek machines.

Another object of the invention is to provide a method of making laminated asbestos-cement sheets of indeterminate lengths.

A further object of the invention is to increase the rate of production of the sheets.

A still further object is to decrease the cost of manufacture by reducing the amount of labor and handling required.

According to the present invention a laminated sheet is formed by sandwiching a layer of a dry mixture of cement and fibers between two continuous webs of asbestos-cement to produce a composite laminated sheet consisting of two outer layers and an intermediate layer or filler, the three layers preferably being of substantially the same average thickness. The sheet so made may be cut to form sidings, roofing shingles, or other products, which products may be textured and, if desired, faced with granules, in the usual manner. The sheet is usually made so that when pressed its thickness would be approximately 0.150", each layer being about 0.050" thick. It is to be understood, however, that these dimensions are merely illustrative. The product made by the practice of my invention is cheaper for the same finished thickness than that made by the conventional methods.

The invention will appear more fully from the following description thereof, reference being had to the accompanying drawings, in which:

Fig. 1 is a perspective view of one form of apparatus, suitable for use in conjunction with a Hatschek machine, in carying out my invention;

Fig. 2 is a top plan view of that apparatus;

Fig. 3 is a diagrammatic view in elevation of one form of complete apparatus, including a conventional Hatschek machine;

Fig. 4 is a schematic top plan view of one form of hopper for use in applying the intermediate layer or filler of dry mix; and, Fig. 5 is a section in elevation of the hopper taken on the line 5—5 of Fig. 4.

Referring now to the drawings, 10 indicates the vats of the Hatschek or "wet" machine, usually three in number. Each vat contains a cylinder screen 11 by which the asbestos-cement pulp or slurry is deposited on the lower contacting surface of the endless belt 12. The thickness of the web 13 formed on the belt is, in general, determined by the number of vats used. The web is carried by the belt over the conventional suction box 14 and under the accumulator drum or roll 15.

In the practice of my invention the drum 15 of the Hatschek machine is not used to wind the web, in the manner in which it usually functions, but is used solely to feed the web on to the conveyor 16. If desired, the accumulator drum may be replaced by a feed roll.

The conveyor 16 carries the web under and in contact with a rotary slitter 17 that severs the web into two parts or sheets 13a and 13b of equal width. The sheet 13a is carried downwardly on to the horizontal conveyor 18, while the sheet 13b is carried sidewise on the conveyors 19 and into superposition with the sheet 13a. In the progress of the sheet 13a it passes under a hopper 20 by which a layer 21 of dry mix of the desired thickness is deposited upon the upper surface of the sheet 13a. The dry mix consists preferably of a mixture of Portland cement and ground asbestos-cement waste in suitable proportions. Substantially equal parts of cement and waste have been found to give satisfactory results. The mix may be applied by any conventional vibrating screen 22. Where it is desired to make a tapered product the screen may be wider along one edge of the sheet than along the other, as seen in Fig. 4, so that as the sheet travels under the hopper the thickness of the mix deposited on the surface will gradually reduce in thickness from one edge towards the other. The moisture contained in the sheet may be sufficient to hydrate the dry cement mix, but if not the dry mix after application may be sprayed with water.

While for the sake of economy I prefer to use a single web 13 of asbestos-cement and split it into two sheets 13a and 13b, it is within the scope of my invention to start with two separately formed sheets if desired. The latter procedure, however, is much more expensive as it requires use of two Hatschek machines instead of one. Moreover, for best results it is important that the two outer asbestos-cement layers be of exactly the same thickness. That result follows naturally from splitting a single web longitudinally into two sheets but is difficult to attain to the required degree when the two sheets are separately formed.

In the particular apparatus illustrated in the drawings the sheet 13b passes upwards and downwards in its path of travel toward the sheet 13a. This is merely an expedient to provide space between the sheets for the hopper 20. The form of the apparatus is immaterial, the essential feature is that the two sheets, after having been severed longitudinally from a single web or separately formed, are continuously progressed so that one of the sheets is superposed, smoothly and flatly, upon the other after the layer of dry mix has been applied to the latter.

The composite sheet may then be passed under a hopper 23 by which, if desired, a facing of grout, or of neat cement and granules, may be applied for the purpose of decorating or ornamenting the material, after which it passes between press rolls 24, and is finally cut by the rotary cutter 25, or other cutting instrumentality, into pieces of the size and shape of the finished product. The cut pieces are then stacked and permitted to set in the usual manner.

In the practice of the method the two sheets are fed continuously and simultaneously at the same rate of speed so as to avoid tearing or buckling of the sheets when they are brought into superposition. In some instances it may be found desirable to give the sheets 13b a partially twisting motion as it travels from slitter 17 to the point where it comes into superposition with the sheet 13a so as to assure that the two sheets will meet in exact parallelism. The roll that carries the rotary slitter 17 may in addition carry cutters at its ends, as indicated in Figs. 1 and 2 of the drawings, to trim the edges of the web 13. The wet scrap cut from the edges may be returned to the vats 10, or it may be dried, set and ground for use in making the dry mix. The upper roll of the pair of press rolls 24 may be plain or it may have a textured surface, in imitation of wood texture or other design, to give the upper surface of the pressed composite sheet a textured appearance.

What I claim is:

A method of making a laminated product which consists in continuously forming and longitudinally feeding a moist web of unset asbestos-cement, continuously slitting the web longitudinally as it is fed to form two homogeneous sheets of substantially uniform width, continuously and simultaneously feeding the two sheets longitudinally one above the other at the same rate of speed, directing the upper of the two sheets laterally at an angle into parallelism with the other, depositing a dry mix of hydraulic cement and asbestos fiber upon the upper surface of the under sheet while the cement of the sheet is still moist and unset before it is brought into contact with the upper sheet, superposing the upper sheet on said faced surface of the lower sheet, and pressing the composite product.

CHARLES CARTER SMITH.

References Cited in the file of this patent

UNITED STATES PATENTS

| Number | Name | Date |
| --- | --- | --- |
| 726,980 | Outerson | May 5, 1903 |
| 1,452,379 | Haren | Apr. 17, 1923 |
| 1,544,843 | Ledeboer | July 7, 1925 |
| 1,737,284 | Loomis | Nov. 26, 1929 |
| 1,751,866 | Loomis | Mar. 25, 1930 |
| 1,819,840 | Holcomb | Aug. 18, 1931 |
| 1,834,363 | Watson et al. | Dec. 1, 1931 |
| 1,904,812 | Albert | Apr. 18, 1933 |
| 2,041,880 | Valtat | May 26, 1936 |
| 2,276,869 | Pond | Mar. 17, 1942 |
| 2,422,345 | Easterberg et al. | June 17, 1947 |

FOREIGN PATENTS

| Number | Country | Date |
| --- | --- | --- |
| 2,327 | Great Britain | of 1898 |